US008245270B2

(12) United States Patent
Cooperstein et al.

(10) Patent No.: US 8,245,270 B2
(45) Date of Patent: Aug. 14, 2012

(54) RESOURCE BASED DYNAMIC SECURITY AUTHORIZATION

(75) Inventors: Jeffrey M. Cooperstein, Bellevue, WA (US); Aaron R. Goldfeder, Seattle, WA (US); Gregory D. Fee, Seattle, WA (US); John M. Hawkins, Duvall, WA (US); Venkatraman Kudallur, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 827 days.

(21) Appl. No.: 11/217,748

(22) Filed: Sep. 1, 2005

(65) Prior Publication Data

US 2007/0050854 A1 Mar. 1, 2007

(51) Int. Cl.
*G06F 21/00* (2006.01)

(52) U.S. Cl. ........... 726/1; 726/2; 726/3; 726/4; 726/24; 726/25; 726/26; 726/27; 726/28; 726/29; 726/30; 709/203; 709/217; 709/218; 709/219; 709/229; 713/164; 713/165; 713/166; 713/167; 713/168; 713/182; 713/183; 713/184; 713/185; 713/186

(58) Field of Classification Search .................. 713/186, 713/182, 156, 164–168; 726/12, 1–8, 21, 726/24–33; 705/39, 64, 2, 67; 709/224, 709/203, 217–219, 200–202
See application file for complete search history.

(56) References Cited

U.S. PATENT DOCUMENTS

| | | | | |
|---|---|---|---|---|
| 5,983,348 A * | 11/1999 | Ji | | 726/13 |
| 6,092,194 A | 7/2000 | Touboul | | 713/200 |
| 6,154,844 A * | 11/2000 | Touboul et al. | | 726/24 |
| 6,275,938 B1 | 8/2001 | Bond et al. | | 726/23 |
| 6,321,334 B1 * | 11/2001 | Jerger et al. | | 726/1 |
| 6,591,265 B1 | 7/2003 | Erickson et al. | | 707/9 |
| 6,629,246 B1 | 9/2003 | Gadi | | 713/202 |
| 6,799,208 B1 | 9/2004 | Sankaranarayan et al. | | 709/223 |
| 7,318,238 B2 | 1/2008 | Elvanoglu et al. | | 726/30 |
| 7,475,404 B2 * | 1/2009 | Hamel | | 719/317 |
| 2002/0073197 A1 * | 6/2002 | Bhogal et al. | | 709/224 |
| 2002/0147923 A1 | 10/2002 | Dotan et al. | | 713/200 |
| 2002/0166052 A1 | 11/2002 | Garg et al. | | 713/182 |
| 2004/0109410 A1 | 6/2004 | Chase et al. | | 370/229 |
| 2004/0205342 A1 | 10/2004 | Roegner | | 713/168 |
| 2004/0268139 A1 | 12/2004 | Christian et al. | | 726/13 |
| 2005/0055570 A1 | 3/2005 | Kwan et al. | | 713/201 |
| 2005/0091536 A1 * | 4/2005 | Whitmer et al. | | 713/201 |
| 2005/0177635 A1 | 8/2005 | Schmidt et al. | | 709/226 |
| 2006/0020679 A1 * | 1/2006 | Hinton et al. | | 709/217 |
| 2006/0277218 A1 | 12/2006 | Franco et al. | | 1/1 |

(Continued)

FOREIGN PATENT DOCUMENTS

CN 1366239 8/2002

(Continued)

OTHER PUBLICATIONS

Jermyn et. al., Out of the sandbox: Third Party Validation for Java Applications, Mar. 25-27, 1998, Int.Soc. Comput. & Their Appl.*

(Continued)

*Primary Examiner* — Taghi Arani
*Assistant Examiner* — Josnel Jeudy
(74) *Attorney, Agent, or Firm* — Merchant & Gould

(57) ABSTRACT

Access to a resource by sandboxed code is dynamically authorized by a client security system based on a resource based policy. A sandboxed application running on a client is granted access to a resource based on a resource based policy despite denial of the access based on a static policy associated with the client security system. The granting of access coincides with the determination that the threat to a user or the user's information is not increased should the access be granted.

20 Claims, 4 Drawing Sheets

U.S. PATENT DOCUMENTS

| | | | |
|---|---|---|---|
| 2007/0016949 A1 | 1/2007 | Dunagan et al. | 726/22 |
| 2007/0299857 A1 | 12/2007 | Gwozdz et al. | 1/1 |
| 2007/0300064 A1 | 12/2007 | Isaacs et al. | 713/168 |
| 2008/0313648 A1 | 12/2008 | Wang et al. | 719/315 |
| 2009/0132713 A1 | 5/2009 | Dutta et al. | 709/227 |
| 2009/0183171 A1 | 7/2009 | Isaacs et al. | 719/311 |
| 2009/0183227 A1 | 7/2009 | Isaacs et al. | 726/1 |
| 2009/0187918 A1 | 7/2009 | Chen et al. | 719/313 |
| 2009/0299862 A1 | 12/2009 | Fan | 705/14.73 |
| 2009/0300496 A1 | 12/2009 | Fan et al. | 715/711 |
| 2009/0327869 A1 | 12/2009 | Fan et al. | 715/240 |
| 2010/0058293 A1 | 3/2010 | Dunagan et al. | 717/116 |

FOREIGN PATENT DOCUMENTS

| | | |
|---|---|---|
| WO | WO 02/019076 A3 | 3/2002 |
| WO | WO 02/39237 A2 | 5/2002 |
| WO | WO 03/073240 A1 | 9/2003 |
| WO | WO 2005/008456 A2 | 1/2005 |

OTHER PUBLICATIONS

"eTrust® Access Control", http://www3.ca.com/solutions/Product/aspx?ID=154, Jun. 8, 2001, 2 pgs.

"Sun Java System Access Manager", http://www.sun.com/software/products/access_mgr/index.xml, Oct. 24, 2004, 3 pgs.

"Access Management and Single Sign-On for Web and J2EE Environments", http://www.entegrity.com/products/aa/aa.shtml, Feb. 6, 2005, 2 pgs.

"IBM Tivoli Federated Identity Manager", http://www-306.ibm.com/software/Tivoli/products/federated-identify-mgr/, Nov. 9, 2005, 5 pgs.

Office Action mailed Jun. 19, 2009, in CN Application No. 200680031682.6 (w/translation).

Office Action mailed Sep. 13, 2010, in CN Application No. 200680031682.6 (w/translation).

* cited by examiner

RESOURCE BASED DYNAMIC SECURITY AUTHORIZATION

BACKGROUND

Security is a primary concern when using an Internet browser to navigate the World Wide Web. The applications that run on a browser may institute actions or execute code that could compromise security. Some browser applications may in fact include malicious code that can infect a computer or gain access to confidential information stored on the computer.

In order to prevent such malicious code from infecting the computer or gaining access to a user's information, mechanisms have been developed to wall-off or contain this code so that it has restricted access to the computer's resources. The security restrictions are often instituted when executable code comes from an unknown or un-validated source and allows the user to run un-secure code. However, a blanket restriction of access to resources also prevents certain legitimate actions from being executed for some applications. For example, two domains on the Internet may be associated with the same source or Internet resource even though they have different domain names (e.g., http://www.site1.com and http://www.site2.com). With current security restrictions, the application is unable to obtain resources from the second domain based on the security access permission granted to the first domain.

SUMMARY

Aspects of the present invention are generally related to providing a resource based security system for dynamic authorization of access to a resource by sandboxed code. Sandboxed code is code associated with an environment in which there are strict limitations on what system resources the code can request or access. Access to the resources is authorized when a threat to the user is shown as not increasing if the authorization took place. Client security policy is static and ensures that users are safe under all circumstances. In many cases however, the client security policy restricts access from resource to resource in an overly restrictive manner. For example, web pages from http://www.site1.com cannot script http://www.site2.com even if they are owned and operated by the same company. The present invention solves this problem by recognizing that the threat to the user or machine is not increased if these sites did script each other. Since the sites are owned and operated by the same company the security access between each site may be assumed. Similarly, even when two domains are not owned or operated by the same company or even related companies, one domain may affirmatively state that the sandboxed application associated with the other company is allowed access to the their associated resource. In accordance with one aspect of the present invention, a resource based policy statement is issued that allows the sandboxed application of one site to script another site despite the presence of a static policy preventing such scripting.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
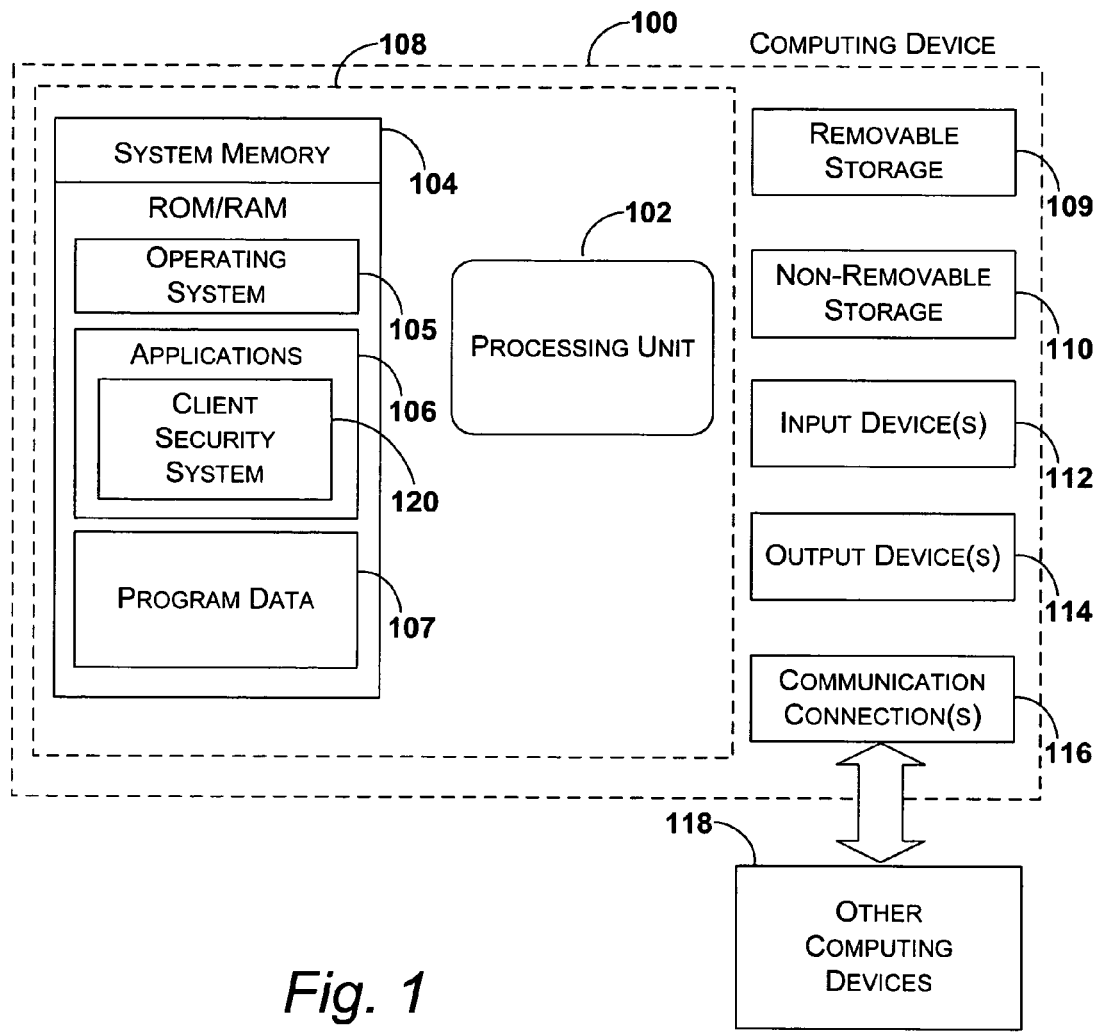
FIG. 1 illustrates an exemplary computing device that may be used in accordance with one exemplary embodiment.

With reference to FIG. 1, one exemplary system for implementing the invention includes a computing device, such as computing device 100. Computing device 100 may be configured as a client, a server, mobile device, or any other computing device. In a very basic embodiment, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a client security system 120 for implementing the system of the present invention. This basic embodiment is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

An embodiment executed by computing device 100 provides for providing a resource based security system for dynamic authorization of access to a resource by sandboxed code. The access is evaluated by comparing evidence of the authenticity of the sandboxed code with a policy associated with the resource. If the evidence is sufficient according to the resource based policy, then access to the resource is authorized. For example, web pages from http://www.site1.com cannot script http://www.site2.com even if they are affiliated or owned and operated by the same company or even if they contain an affirmative statement that an application associated with one web page may access data from the other web page. The present invention solves this problem by recognizing that the threat to the user or machine is not increased if these sites did script each other. A policy statement may be included at site2 which partially states:

```
<AllowScriptAccess>
  <Sites>
    http://www.site1.com
  </Sites>
</AllowScriptAccess>
```

The policy statement further includes requirements for evidence of the authenticity of the sandboxed code. When the evidence is sufficient for the requirements, the policy authorizes web pages of site1 to script web pages of site2. Other examples for granting access to a resource based on a resource based dynamical authorization are provided in the discussion below.

Except for a broader meaning that allows the disclosure and claims herein to encompass a wider variety of alternative embodiments, the following terms as used herein and throughout the claims are generally defined as follows:

"Dynamic authorization" is generally defined as authorization based on policies that determine the access to resources on a resource-by-resource basis. Stated differently, the authorization is dynamic because there is no fixed set of resources that a sandboxed application may access.

"Evidence" is generally defined as any information about an application that identifies the application or that provides support for the application's authenticity. Evidence may include information about the source of the application, the type of application, and other information that relays that the application may be trusted to operate correctly. When an application has evidence referred to as sufficient, then the application has successfully identified itself to a resource as an application that may be trusted.

"Resource" is generally defined as a web page, a file, a database, or the like. Resources are accessed and used by users and applications during executions or web browsing events.

"Resource based policy" generally refers to a policy wherein the resources decide which sandboxed application or sandboxed code may access that resource.

"Sandboxed code" or a "sandboxed application" refers to code that has been walled-off or restricted from the other applications, code, and resources on a client. The restricted code corresponds to a restricted environment within which the sandboxed code runs. In one embodiment corresponding to managed code, the sandboxed code refers to code managed under code access security that prevents the code from accessing resources that are protected. In another example, during web browsing, the code associated with a web page is operated as sandboxed code and is allowed to access only limited resources of the computing device. Sandboxed code may be limited to accessing the data created or provided in association with the sandboxed code, some limited user interface functions, and the resource associated with the source (e.g., source web server) of the sandboxed code.

Figure 2:
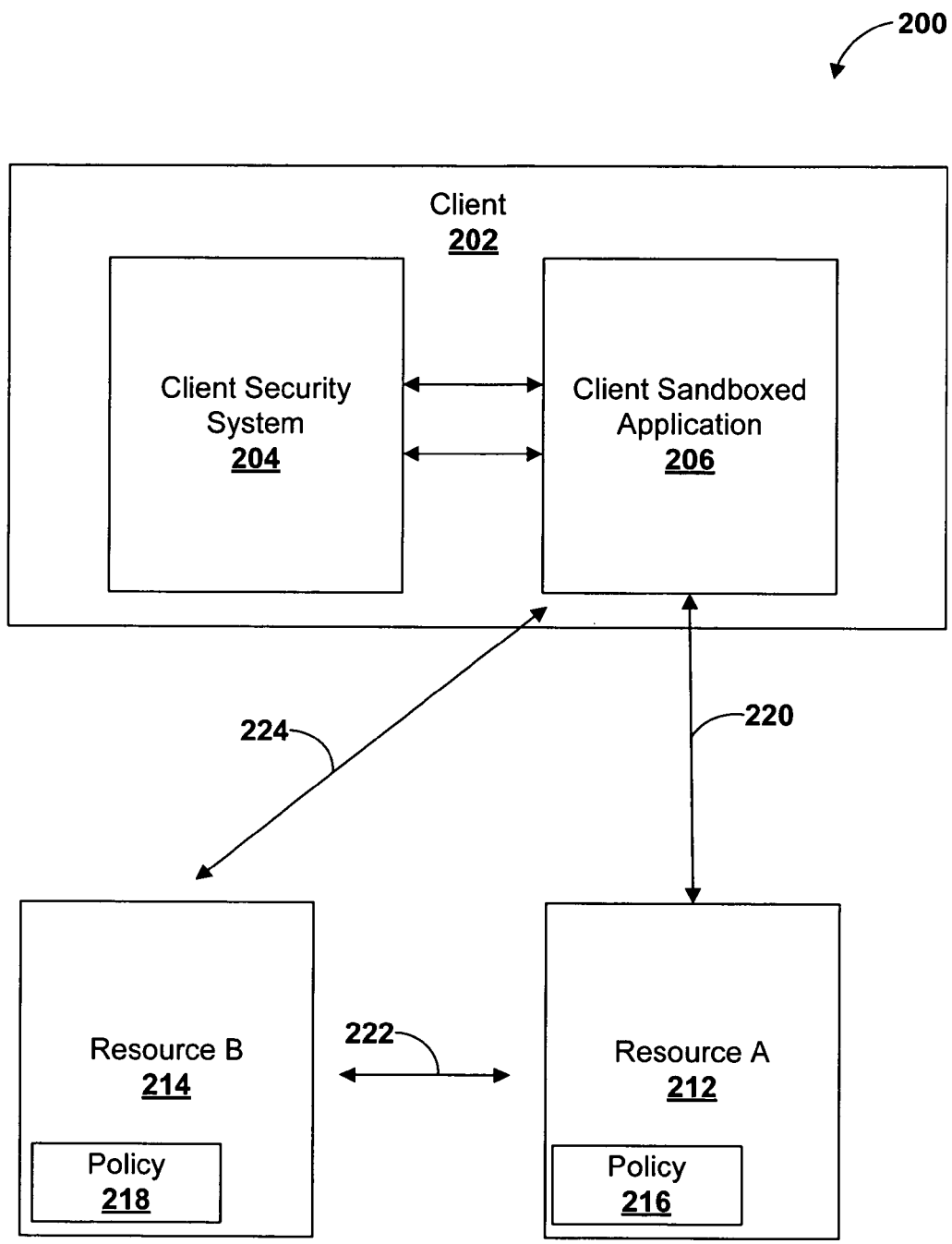
FIG. 2 illustrates a functional diagram of an exemplary system for providing dynamic security authorization for access to a resource.

FIG. 2 illustrates a functional diagram of an exemplary system for providing dynamic security authorization for access to a resource in accordance with one embodiment. System 200 includes client 202, resource A 212, and resource B 214. Client 202 includes client security system 204 and client sandboxed application 206. In one embodiment, client 202 corresponds to the computing device described in relation to FIG. 1. Furthermore, although resource A 212 and resource B 214 are shown as separate from client 202, these resources may also be located within client 202 (e.g., within memory or on disk).

Client security system 204 provides the control and enforcement of the restrictions of client sandboxed application 206. The restrictions correspond to limitations on actions that client sandboxed application 206 may take, as well as limitations on resources that the application may access.

In one implementation of system 200, client restriction application is sourced by resource A 212. For example, client restriction application 206 is an application running on client 202 (e.g., within a browser application), and client restriction application 206 was provided by a web server that corresponds to resource A 212. When running, client restriction application 206 is allowed to access resource A 212 using connection 220 since a static security setting exists according to client security system 204 that states that a sandboxed application may access a resource that corresponds to the source of the sandboxed application.

In one example however, it may be that client sandboxed application 206 desires to access resource B 214 using unrestricted connection 224. Resource B 214 corresponds to another web server providing a separate web page. Access of this type, sometimes referred to as "cross-domain" access is usually among the activities prevented by client security system 204. However, under certain circumstances, resource A 212 and resource B 214 are owned and operated by the same entity. Since the resources are commonly owned, communication may take place between the resources. Similarly, using the communication between resources, communication may be rigged between resource B 214 and client sandboxed application 206 across connections 222 and 220 by redirecting or shuffling communication through resource A 212. Often however, this communication may be unidirectional or suffer from other inefficiencies. However, due to the common ownership between resources, the threat to a user or a user's information would not be increased by allowing a communication between client sandboxed application 206 and resource B 214 across connection 224. Despite this lack of threat, the sandbox environment still prevents unrestricted communication between resource B 214 and client sandboxed application 206 across connection 224.

One embodiment provided herein solves this restriction by allowing client sandboxed application 206 to check a resource based policy (e.g., policy 216, policy 218)) that dynamically authorizes the communication across connection 224. In one embodiment, when resource A 212 is the source of client sandboxed application 206, the application checks for the allowance of the communication with resource B 214 against a policy (e.g., policy 216) associated with resource A 212. In another embodiment, a service connection, separate from a full communication connection, is established between client sandboxed application 206 and resource B 214 to check for permission against a policy (e.g., policy 218) associated with resource B 214. Exemplary methods for dynamically authorizing access to a resource are further described in the discussion of FIGS. 3 and 4 below.

In another implementation of system 200, resource B 214 corresponds to a database server that may or may not be associated with resource A 212. Resource B 214 may be configured with a resource based policy that associates resource B 214 with client sandboxed application 206. Resource B 214 may then communicate to client 202 that client sandboxed application 206 is authorized to access the database server.

Other embodiments provide other uses for when a resource may be accessed by a sandboxed application based on a resource based policy. Additionally, although two resources are shown (resource A 212 and resource B 214) the present invention is equally applicable to a scenario involving only one resource or multiple resources.

Figure 3:
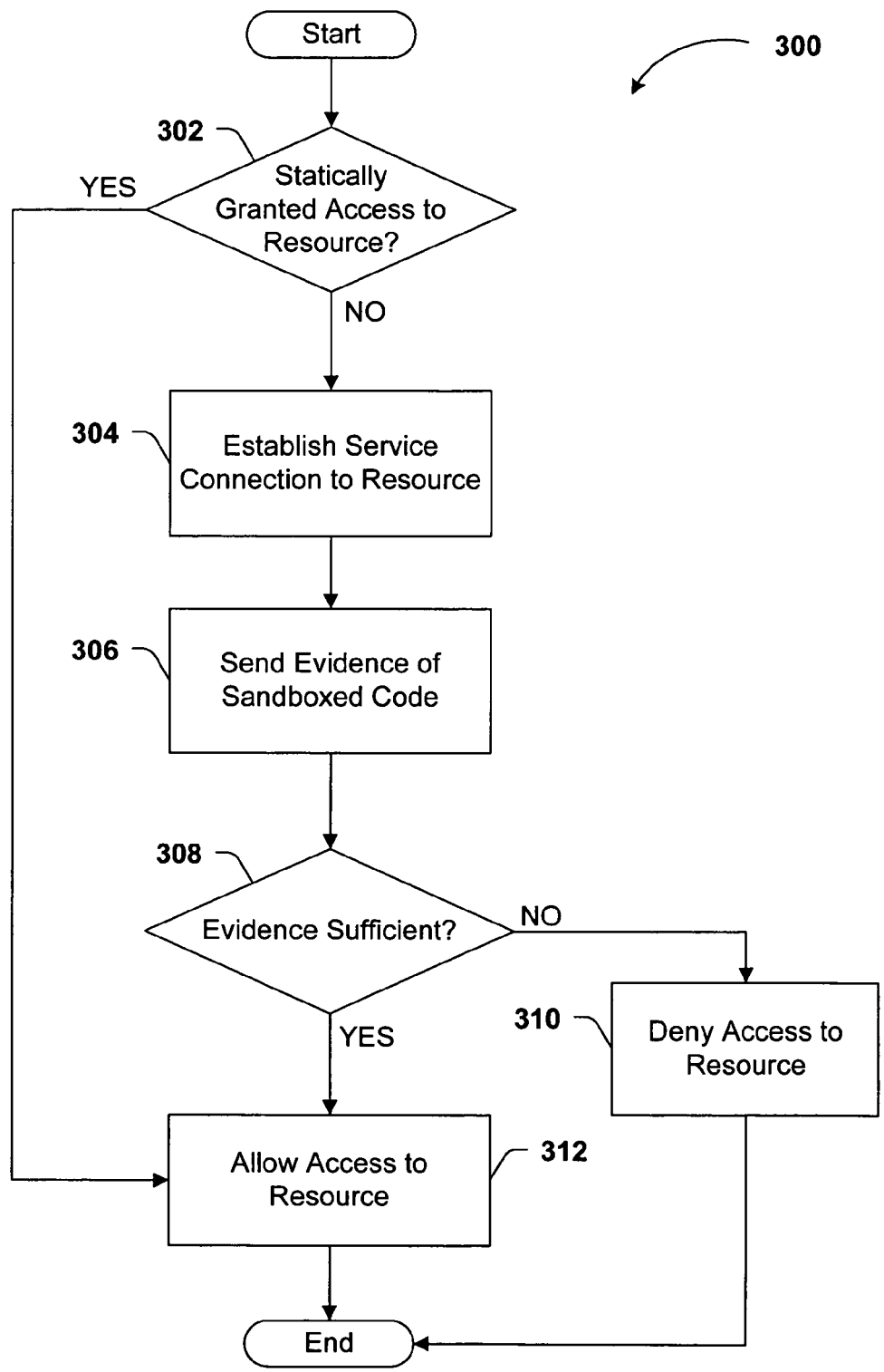
FIG. 3 illustrates a flow diagram representing an exemplary embodiment of a process for providing dynamic security authorization for access to a resource.

FIG. 3 illustrates a flow diagram representing an exemplary embodiment of a process for providing dynamic security authorization for access to a resource. Process 300 starts where a client sandboxed application or sandboxed code is included on a client machine, and an attempt has been made for the sandboxed code to access a particular resource. Processing continues at access decision operation 302.

Access decision operation 302 determines whether the sandboxed code has access granted according to static client security policy. A static client security policy corresponds to a policy dictated by the client security system enforcing the restrictions on the sandboxed code. For example, it may be that the resource to be accessed is the source of the sandboxed code present on the client. A policy may already be in place by the client security application that authorizes access to the resource based on the resource corresponding to the source of the sandboxed code. In one embodiment, the policies set by the client security system are static policies that do not change, but may however be overridden by external policies. If access to the resource by the sandboxed code is granted by a static policy, processing advances to access allowance operation 312. However, if a static policy does not exist that grants access to the resource, then processing continues with service connection operation 304.

Service connection operation 304 establishes a service connection between the resource and the sandboxed code. In one embodiment, the service connection is separate from other communication connections such as an unrestricted web connection. The service connection is limited in its functionality to confirming whether the sandboxed code meets any existing resource based policies that grant the code access to the resource. In another embodiment, the service connection corresponds to a connection to another resource related to the resource for which access is being sought. Access to the other resource is granted according to a static policy set by the client security system. A resource based policy associated with the other resource may exist that authorizes access to the resource according to the relation between the resource and the other resource. Once a service connection is established, processing continues to evidence transmission operation 306.

Evidence transmission operation 306 sends evidence of the sandboxed code to the resource across the service connection. Evidence of the sandboxed code refers to evidence that shows whether the sandboxed code corresponds to a legitimate application that is running on the client. The evidence may include the source of the sandboxed code, as well as other identifying factors for the sandboxed code. Once the evidence is sent across the service connection to the resource, processing continues at sufficiency determination operation 308.

Sufficiency determination operation 308 determines whether the evidence provided to the resource is sufficient to identify the sandboxed code as code that meets a resource based policy. The resource is able to compare the evidence against the resource based policy and dynamically authenticate access to the resource when the evidence indicates that the sandboxed code meets the policy. If the evidence is insufficient when compared to the resource based policy, then processing moves to denial operation 310.

Denial operation 310 prevents the sandboxed code from accessing the resource since the evidence supplied by the sandboxed code did not meet the policy. After the denial of access, processing ends and process 300 moves to other tasks related to running the sandboxed code.

Alternatively, if the evidence provided by the sandboxed code to the resource is found to be sufficient, processing moves to allowance operation 312. Allowance operation 312 grants the sandboxed code access to the resource. The grant of access to the resource coincides with the determination that the risk to a user's information is not increased by the authorization to access the resource. Once access is granted to the resource, processing ends and process 300 moves to other tasks related to running the sandboxed code.

Figure 4:
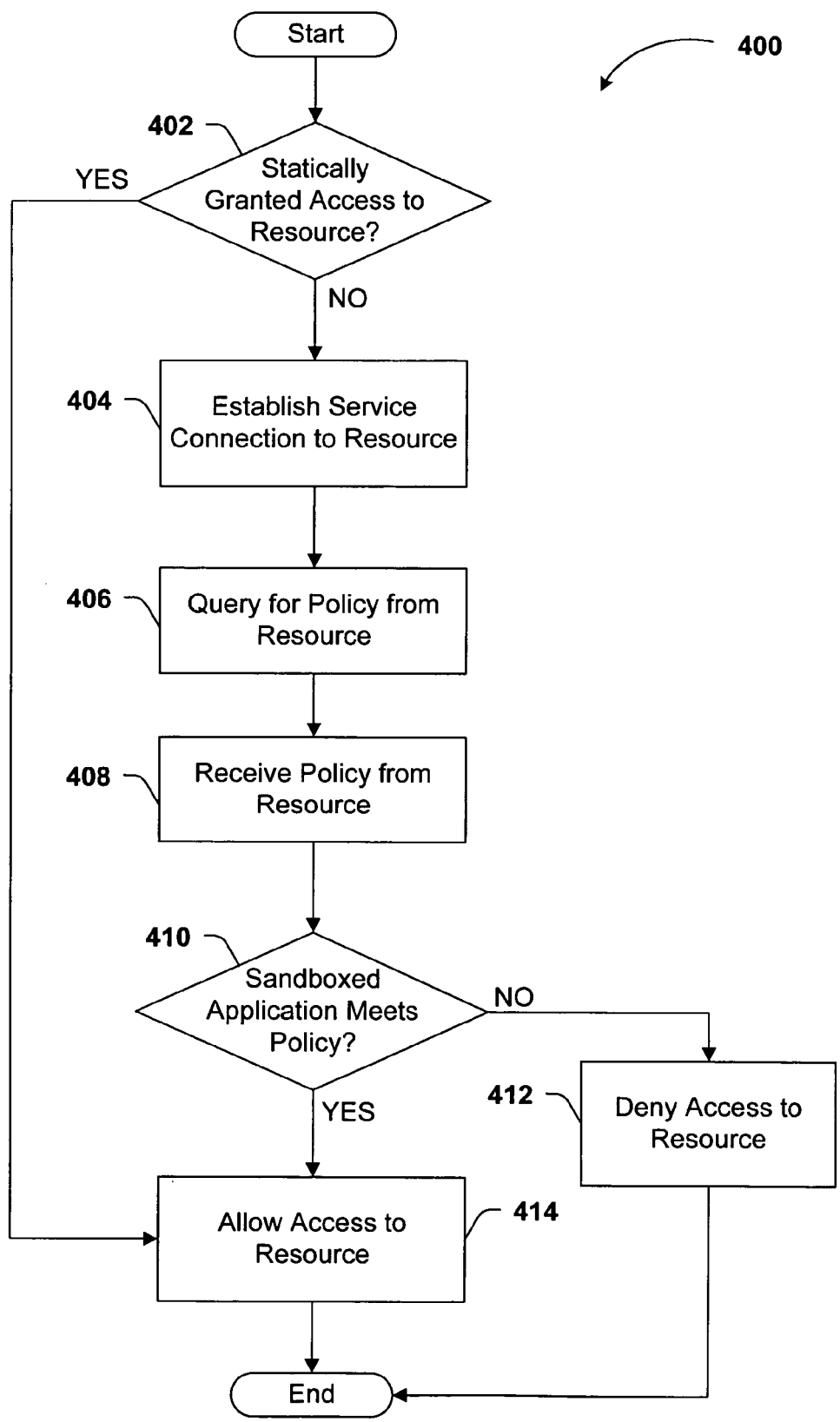
FIG. 4 illustrates a flow diagram representing another exemplary embodiment of a process for providing dynamic security authorization for access to a resource, in accordance with one embodiment of the present invention.

FIG. 4 illustrates a flow diagram representing another exemplary embodiment of a process for providing dynamic security authorization for access to a resource. Process 400 starts similarly to process 300 of FIG. 3, where a client sandboxed application or sandboxed code is present on a client and a request has been made for the sandboxed code to access a particular resource. Processing continues at access decision operation 402.

Access decision operation 402 determines whether the sandboxed code has access granted according to static client security policy. A static client security policy corresponds to a policy dictated by the client security system enforcing the restrictions on the sandboxed code. For example, it may be that the resource to be accessed is the source of the sandboxed code present on the client. A policy may already be in place by the client security application that authorizes access to the resource based on the resource corresponding to the source of the sandboxed code. In one embodiment, the policies set by the client security system are static policies that do not change, but may however be overridden by external policies. If access to the resource by the sandboxed code is granted by a static policy, processing advances to access allowance operation 414. However, if a static policy does not exist that grants access to the resource, then processing continues with service connection operation 404.

Service connection operation 404 establishes a service connection between the resource and the sandboxed code. The service connection established for process 400 is similar to the service connection established for process 300 described in accordance with FIG. 3. Once a service connection is established, processing continues to policy query operation 406.

Policy query operation 406 queries the resource over the service connection to determine the resource based policy that may authorize the sandboxed code to access the resource. The query is sent by the sandboxed code to the resource. Once the query is sent, processing continues to policy receipt operation 408.

Policy receipt operation 408 receives the resource based policy from the resource. The policy may correspond to a set of criteria that the sandboxed code must meet to access the resource. Once the policy is received by the sandboxed code on the client, processing continues with sufficiency determination operation 410.

Sufficiency determination operation 410 determines whether the sandboxed code meets the requirements of the received resource based policy. The client security system is able to compare the attributes of the sandboxed code against the resource based policy and dynamically authenticate access to the resource when the comparison indicates that the sandboxed code meets the policy. In another embodiment, the client security system compares the attributes of the sandboxed code to the received resource based policy to determine if the sandboxed code meets the policy. If the sandboxed code does not meet the resource based policy, then processing moves to denial operation 412.

Denial operation 412 prevents the sandboxed code from accessing the resource since the sandboxed code did not meet the received policy. After the denial of access, processing ends and process 400 moves to other tasks related to running the sandboxed code.

Alternatively, if the sandboxed code is found to meet the resource based policy requirements, processing moves to allowance operation 414. Allowance operation 414 grants the sandboxed code access to the resource. The grant of access to the resource coincides with the determination that the risk to a user's information is not increased by the authorization to access to the resource. Once access is granted to the resource, processing ends and process 400 moves to other tasks related to running the sandboxed code.

In both process 300 and 400 of FIGS. 3 and 4, the resource based policy is shown as controlling the access of the sandboxed code to the resource. In other embodiments, a determination may be made that despite the presence of a resource based policy, a static policy provided by the client security system should still control. In still other embodiments, the static policy and the dynamic resource based policy may be applied together for the access determination of the resource.

Although the above discussion concentrates mainly on the situation where dynamic authorization is provided for access to a resource that is otherwise restricted by a static policy, the above described invention may also be used for the denial of access as well. For example, a resource such as http://www.example.com/page1 may have a policy that does not allow access by http://www.example.com/page2 though a static policy would allow access. Correspondingly to how the present invention dynamically grants access to a resource, the present invention may also dynamically deny access to resource.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for managing access to a second resource by sandboxed code included on a client, the method comprising:
    executing the sandboxed code on the client and allowing operations to execute that adhere to a static security policy; wherein the sandboxed code has restricted access to resources and other applications; wherein the sandboxed code is specifically authorized by the static security policy to access a first resource through a first connection; wherein the first resource includes an associated first resource policy;
    determining when the sandboxed code on the client requests access to the second resource that is not authorized by the static security policy; wherein authorization of the request to the second resource results in a direct cross-domain access to the second resource between the sandboxed code and the second resource that is not authorized by the static security policy; wherein the cross-domain access results in a connection to a web server to provide the second resource to the sandboxed code on the client;
    establishing a service connection that is a different network connection from the first connection between the second resource and the client that is limited in its functionality to confirming whether the sandboxed code meets any existing resource based policies that grant the sandboxed code access to the second resource;
    comparing evidence of the sandboxed code sent using the service connection against a resource based policy associated with at least one of the first resource and the second resource; wherein the resource based policy is stored with the first resource; and
    providing the sandboxed code access to the second resource when the evidence is determined as sufficient according to the resource based policy.

2. The computer-implemented method of claim 1, wherein the evidence is determined as sufficient according to the resource based policy when granting the sandboxed code access to the second resource does not increase a threat level to user data.

3. The computer-implemented method of claim 2, wherein granting the sandboxed code access to the second resource does not increase a threat level to user data when the second resource is affiliated with a source resource that provided the sandboxed code to the client.

4. The computer-implemented method of claim 1, wherein the evidence is transmitted to the second resource for comparing the evidence against the resource based policy.

5. The computer-implemented method of claim 1, wherein the resource based policy is transmitted to the client for comparing the evidence against the resource based policy.

6. The computer-implemented method of claim 1, further comprising alternatively denying access by the sandboxed code to the second resource when the resource based policy dictates that access to the second resource is denied and the access to the second resource is otherwise allowed.

7. The computer-implemented method of claim 1, wherein the resource based policy is applied for managing access to the second resource along with a static policy.

8. The computer-implemented method of claim 1, wherein the service connection corresponds to a communication connect other than an unrestricted connection.

9. The computer-implemented method of claim 1, wherein the static security policy is supplied by the client security system.

10. A system for managing access to a second resource by sandboxed code included on a client, comprising:
  on the client executing the sandboxed code on a processor and allowing operations to execute that adhere to a static security policy; wherein the sandboxed code has restricted access to resources and other applications; wherein the sandboxed code is specifically authorized by the static security policy to access a first resource through a first connection; wherein the first resource includes an associated first resource policy;
  determining when the sandboxed code on the client requests access to the second resource that is not authorized by the static security policy; wherein authorization of the request to the second resource results in a direct cross-domain access to the second resource between the sandboxed code and the second resource that is not authorized by the static security policy; wherein the cross-domain access results in a connection to a web server to provide the second resource to the sandboxed code on the client;
  establishing a service connection that is a different network connection from the first connection between the second resource and the client that is limited in its functionality to confirming whether the sandboxed code meets any existing resource based policies that grant the sandboxed code access to the second resource;
  comparing evidence of the sandboxed code sent using the service connection against a resource based policy associated with at least one of the first resource and the second resource using a client security system; wherein the resource based policy is stored with the first resource; and
  providing the sandboxed code access to the second resource when the evidence is determined as sufficient according to the resource based policy.

11. The system of claim 10, wherein the static security policy is supplied by the client security system.

12. The system of claim 10, wherein the client security system is further configured to determine that the evidence is sufficient according to the resource based policy when granting the sandboxed code access to the second resource does not increase a threat level to user data.

13. The system of claim 10, wherein the service connection is configured to transmit data between the second resource and the sandboxed code for the purposes of evaluating the evidence against the resource based policy.

14. The system of claim 13, wherein the service connection is further configured to transmit the evidence to the second resource for the evaluation.

15. The system of claim 13, wherein the service connection is further configured to transmit the resource based policy to the client security system for the evaluation.

16. The system of claim 10, wherein the second resource corresponds to the web server.

17. The system of claim 10, wherein the second resource corresponds to a database server.

18. The system of claim 10, wherein the client security system is further configured to determine that the evidence is sufficient according to the resource based policy when the sandboxed code is identified as associated with a source resource that is affiliated with the second resource.

19. The system of claim 10, wherein the service connection corresponds to a communication connection other than an unrestricted connection.

20. A computer-readable storage device medium having stored thereon computer-executable instructions for dynamically managing access to a second resource by sandboxed code included on a client, the computer-executable instructions comprising:
  executing the sandboxed code on the client and allowing operations to execute that adhere to a static security policy; wherein the sandboxed code has restricted access to resources and other applications; wherein the sandboxed code is specifically authorized by the static security policy to access a first resource through a first connection; wherein the first resource includes an associated first resource policy;
  determining when the sandboxed code on the client requests access to the second resource that is not authorized by the static security policy; wherein authorization of the request to the second resource results in a direct cross-domain access to the second resource between the sandboxed code and the second resource that is not authorized by the static security policy; wherein the cross-domain access results in a connection to a web server to provide the second resource to the sandboxed code on the client;
  establishing a service connection that is a different network connection from the first connection between the second resource and the client that is limited in its functionality to confirming whether the sandboxed code meets any existing resource based policies that grant the sandboxed code access to the second resource;
  comparing evidence of the sandboxed code sent using the service connection against a resource based policy associated with at least one of the first resource and the second resource; wherein the resource based policy is stored with the first resource; and
  providing the sandboxed code access to the second resource when the evidence is determined as sufficient according to the resource based policy.

* * * * *